US012266324B2

(12) United States Patent
Kammerer

(10) Patent No.: US 12,266,324 B2
(45) Date of Patent: Apr. 1, 2025

(54) QUICK RELEASE PICKUP MOUNTING FOR STRINGED INSTRUMENTS

(71) Applicant: Jon David Kammerer, Hamilton, IL (US)

(72) Inventor: Jon David Kammerer, Hamilton, IL (US)

( * ) Notice: Subject to any disclaimer, the term of this patent is extended or adjusted under 35 U.S.C. 154(b) by 515 days.

(21) Appl. No.: 17/659,488

(22) Filed: Apr. 17, 2022

(65) Prior Publication Data

US 2023/0335084 A1 Oct. 19, 2023

(51) Int. Cl.
*G10D 1/00* (2020.01)
*G10D 1/08* (2006.01)
*G10H 3/18* (2006.01)

(52) U.S. Cl.
CPC ............ *G10D 1/085* (2013.01); *G10H 3/181* (2013.01)

(58) Field of Classification Search
CPC ........... G10D 1/085; G10D 1/08; G10D 3/06; G10H 3/181; G10H 3/183
See application file for complete search history.

(56) References Cited

U.S. PATENT DOCUMENTS 11,024,269 B2 * 6/2021 Reddick ................ G10H 3/181

* cited by examiner

*Primary Examiner* — Kimberly R Lockett

(57) ABSTRACT

An improved body for a stringed instrument wherein the pickups are extended from a mount that can be removed from and replaced into a pocket in the rear surface of the instrument body without the use of tools. When the pickup mount is fully seated in the pocket in the rear surface of the body of the instrument, the pickups protrude through openings in the front surface of the body or pickguard in their proper location in relationship to the strings. Retractable tapered projections secure the pickup mount in the pocket in the instrument body. Pickups can be changed quickly during live performances. Unlimited combinations of pickups can be explored in order to find the best tones. The beauty of the front of the guitar is preserved while flexibility in sound is gained.

2 Claims, 2 Drawing Sheets

QUICK RELEASE PICKUP MOUNTING FOR STRINGED INSTRUMENTS

CROSS-REFERENCE TO RELATED APPLICATIONS

Not Applicable

FEDERALLY SPONSORED RESEARCH

Not Applicable

JOINT RESEARCH AGREEMENT

Not Applicable

INCORPORATION-BY-REFERENCE OF MATERIAL SUBMITTED ELECTRONICALLY

Not Applicable

BACKGROUND OF THE INVENTION

Field of the Invention

This invention relates to stringed musical instruments and, more particularly, to a new and improved body construction for such instruments.

PRIOR ART

| Patent | | U.S. Patents | |
|---|---|---|---|
| Number | Kind Code | Issue Date | Patentee |
| 6253654 | B1 | 2001 Jul. 3 | Mercurio |

A large variety of pickups are available for electric stringed instruments producing a large variety of tones. However, removal and replacement of pickups as traditionally mounted is not a simple task so the enjoyment of this large variety of pickups by the owner of the instrument is limited by their ability to do the job, their willingness to take the time to do the job, and their willingness to risk damaging the body of the instrument.

Typically, several screws must be removed to allow removal of a back cover for access to the pickup wiring. This cover can take the form of a pickguard on the front of the instrument as well. The wires to the pickups must be disconnected. One or more pickups must then be removed individually from the body or pickguard of the instrument where they are secured by screws. Removal of the pickup often necessitates removal or loosening of the strings as well. Replacing a pickup is the reverse of removal so all of the steps are repeated. Needed is a body for a stringed instrument that allows the simple and rapid removal and replacement of pickups through the back of the instrument without the use of tools and without the need to remove the strings or disturb the front of the body in any way.

On the vast majority of instruments, pickups are mounted in pockets that do not completely pierce the front of the body. The pickup flanges and fasteners remain on the front surface of the body while a very small hole in the base of the pocket allows wiring into the area where the electronics are housed. In this configuration, the fasteners must be removed with precision due to their small size and their proximity to the strings and the risk of tool damage to the front of the instrument where the most expensive woods and finishing techniques are used. Additionally, the strings must often be loosened or removed.

In contrast to the prior art, this embodiment of the current invention requires no tools to remove the pickup from the instrument body or to replace the pickup into the instrument body. There is no risk of damaging the body finish on the front of the instrument and the strings need not be loosened or removed. There is no need to disturb the front of the body in any way.

In U.S. Pat. No. 6,253,654 (2001) Mercurio provides an improvement over the prior art by attaching pickups to a faceplate that is attached to a baseplate and the entire assembly is interchangeable with other identical assemblies through the back of the instrument. Removal of this assembly removes a rectangular portion of the front of the guitar spanning from the base of the neck to the bridge. Pickups cannot be removed without also removing this portion of the body.

In contrast to the Mercurio patent, this embodiment of the current invention allows removal and replacement of pickups via the back of the instrument without the requirement to also remove a rectangular portion of the front of the instrument spanning from the base of the neck to the bridge. This embodiment of the current invention is an improvement over the Mercurio patent in that it does not disturb the front of the instrument, the most aesthetically important part of the instrument.

The Mercurio patent does not work without the faceplate portion of the pickup assembly mentioned in the claims. It is in fact a conventional pickup connection to the outside surface surrounding the pickup pocket of the front of the guitar but that part of the front of the guitar is then removed along with the pickups. In contrast, this embodiment of the current invention obviates the need for a removable faceplate because the mounting extends the pickup alone through the pickup opening from a location behind the pickup opening.

Nowhere in the Mercurio patent was it contemplated that the front of the instrument would be left intact while only the pickups were removed via the back of the instrument. Such an outcome is possible in this embodiment of the current invention because the front of the instrument has openings only large enough to allow pickups to pass through. The entire cross sectional area of the mounting does not pass entirely through the body as it must in the Mercurio patent.

SUMMARY

The above problems and others are at least partially solved and the above purposes and others realized in this new and improved body for a stringed instrument wherein the pickups are extended from a mount that can be removed from and replaced into a pocket in the rear surface of the instrument body without the use of tools. When the pickup mount is fully seated in the pocket in the rear surface of the body of the instrument, the pickups protrude through openings in the front surface of the body or pickguard in their proper location in relationship to the strings. Retractable tapered projections secure the pickup mount in the pocket in the instrument body.

Advantages

The advantages to a guitar player are many: pickups can be changed quickly during live performances; unlimited combinations of pickups could be explored in order to find the best tones; the beauty of the front of the guitar is preserved while flexibility in sound is gained.

Further objects and advantages of this embodiment of the invention will become apparent from a consideration of the drawings and ensuing description.

BRIEF DESCRIPTION OF THE SEVERAL VIEWS OF THE DRAWINGS

Referring to the drawings.

DRAWINGS

Reference Numerals

Figure 1:
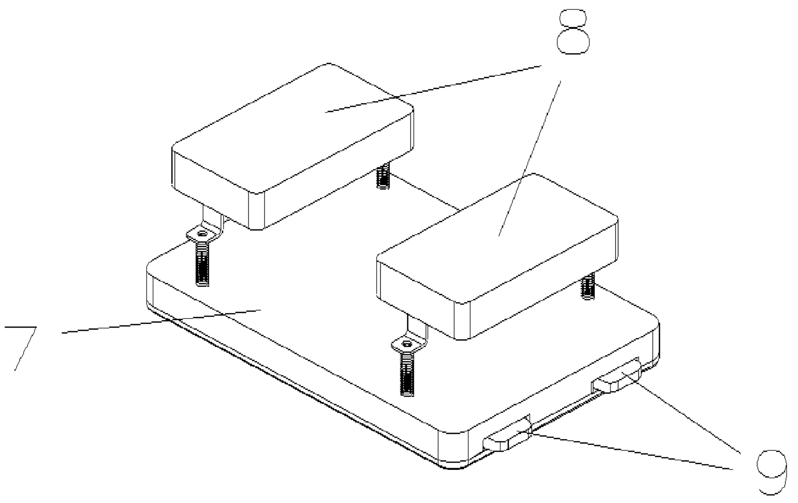
FIG. 1 is a top isometric view of the pickup mounting showing the position of the pickups extending from the mounting.

1. body
2. front surface of body
3. rear surface of body
4. pocket
6. pickup opening
7. mounting
8. pickup
9. retractable tapered projections
10. retraction mechanism
11. slots

DETAILED DESCRIPTION OF THE INVENTION

Figure 2:
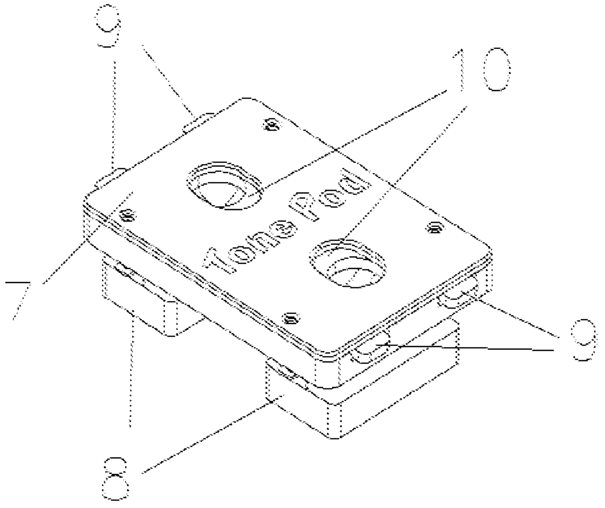
FIG. 2 is a back isometric view of the pickup mounting showing the position of the mechanism for retracting the retractable tapered projections and the tapered projections.
Figure 3:
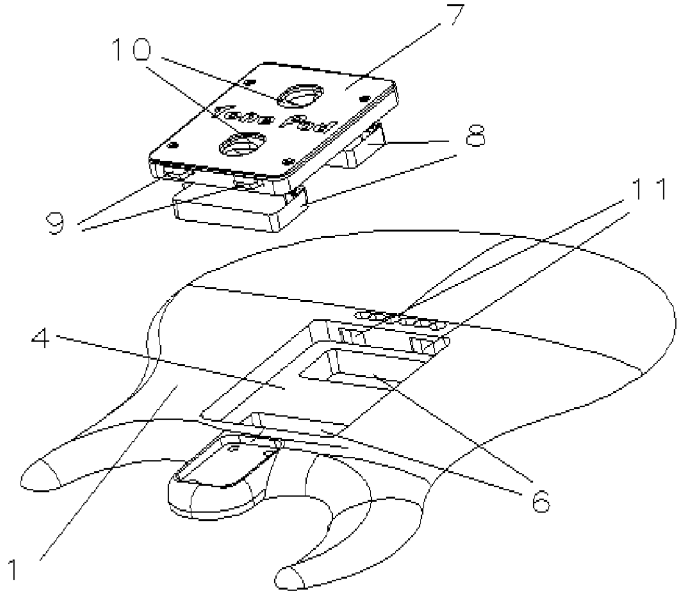
FIG. 3 is a back isometric view of the body showing the pocket and slots and pickup openings.
Figure 4:
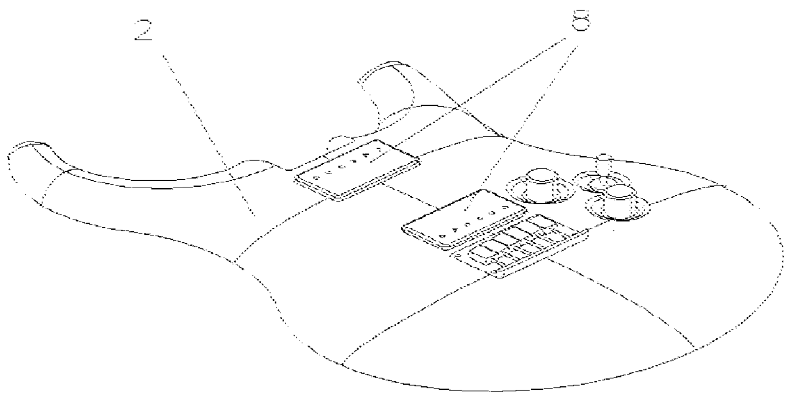
FIG. 4 is front isometric view of the body showing the pickups protruding through the pickup openings.

In its preferred embodiment the present body is illustrated in FIGS. 1 to 4 as applied to a guitar body wherein the pickup mounting uses spring loaded retractable tapered projections; it should be readily apparent, however, that in other embodiments another means of maintaining the retractable tapered projections in their fully extended position could be used.

FIGS. 1 to 4 show a stringed instrument body comprising a body 1 having a front surface 2 and a rear surface 3. The rear surface 3 contains a pocket 4. Pickups 8 extend a selected distance from mounting 7 and protrude through pickup openings 6. Pocket 4 in rear surface 3 has slots 11 to receive retractable tapered projections 9 extending laterally from mounting 7. Retractable tapered projections 9 are retracted by retraction mechanism 10.

In the embodiment depicted in FIGS. 1 to 4, the rear surface 3 of body 1 has one pocket 4 and one mounting 7 for two pickups 8. According to other embodiments the rear surface 3 of body 1 could have any number of pockets 4 less than or equal to the number of pickup openings 6 in the front surface 2 of body 1.

OPERATION OF PREFERRED EMBODIMENT

The retraction mechanism 10 is squeezed by finger pressure and mounting 7 with pickups 8 is withdrawn from pocket 4 in rear surface 3 of body 1 causing pickups 8 to be withdrawn from pickup openings 6 in front surface 2 of body 1. Standard quick connect wiring (not shown) attached to pickups 8 is then disconnected.

Different pickups 8 could now be attached to the mounting 7 or a different mounting 7 with pickups 8 already attached could be used. Before replacing mounting 7 with pickups 8 into pocket 4 in rear surface 3 of body 1, standard quick connect wiring (not shown) must be reconnected.

Retraction mechanism 10 is squeezed by finger pressure while mounting 7 with pickups 8 is replaced into pocket 4 in rear surface 3 of body 1. Pickups 8 which extend from mounting 7 thus protrude from pickup openings 6 in front surface 2 of body 1. Retraction mechanism 10 is released and retractable tapered projections 9 extend into slots 11.

While there is shown and described the present embodiment of the invention, it is to be distinctly understood that this invention is not limited thereto but may be variously embodied to practice within the scope of the following claims.

I claim:

1. A stringed instrument body, comprising: a body having a front surface and a rear surface; a pocket in said rear surface of said body which does not extend completely through the thickness of said body; one or more pickup openings in said front surface of said body which penetrate into said pocket in said rear surface of said body; a mounting for one or more pickups that fits into said pocket in said rear surface of said body; one or more pickups extending from said mounting such that the plane of said one or more pickup is parallel to the plane of said mounting; said mounting includes paired retractable tapered projections acting laterally; said pocket in said rear surface of said body includes slots to receive said paired retractable tapered projections of said mounting securing said mounting in said pocket; whereby said mounting and said one or more pickups can be rapidly removed from said pocket of said rear surface of said body and rapidly replaced into said pocket of said rear surface of said body.

2. The stringed instrument body of claim 1 wherein said front surface of said body includes a pickguard and said one or more pickup openings are in said pickguard.

* * * * *